June 30, 1931.  P. JENKINS  1,812,406
CLOTH CUTTING MACHINE
Filed April 8, 1929  2 Sheets-Sheet 1
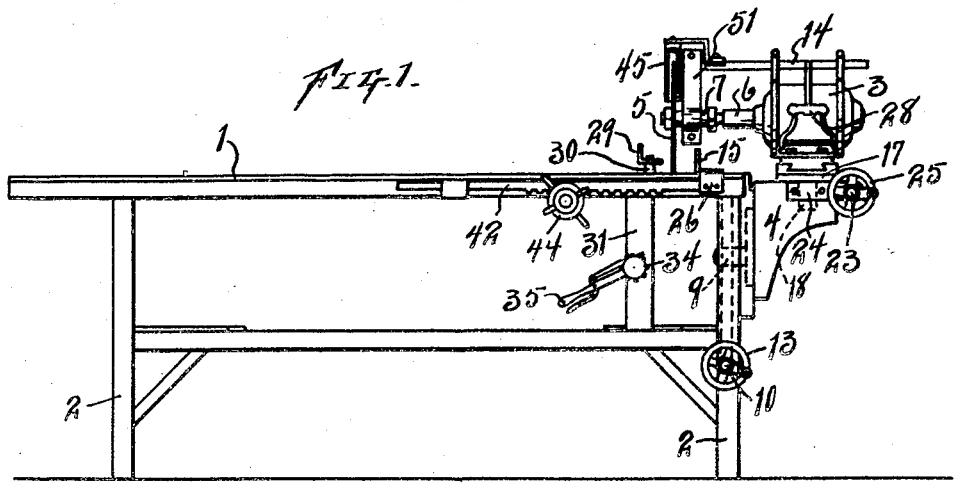
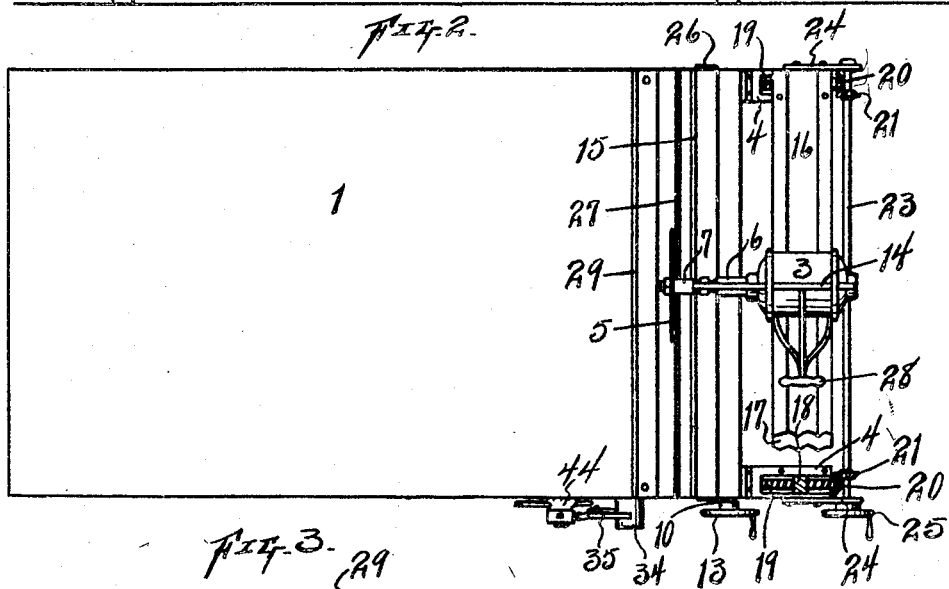
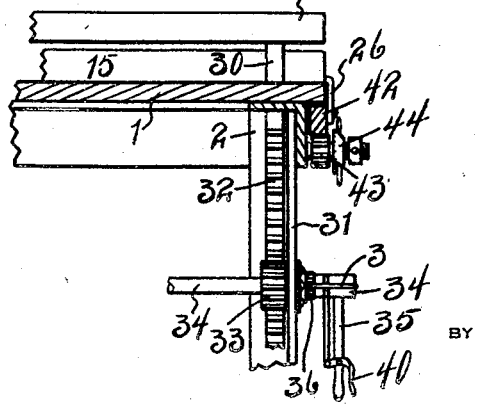
INVENTOR
PETER JENKINS
BY *A. D. Jackson*
ATTORNEY June 30, 1931.    P. JENKINS    1,812,406
CLOTH CUTTING MACHINE
Filed April 8, 1929    2 Sheets-Sheet 2
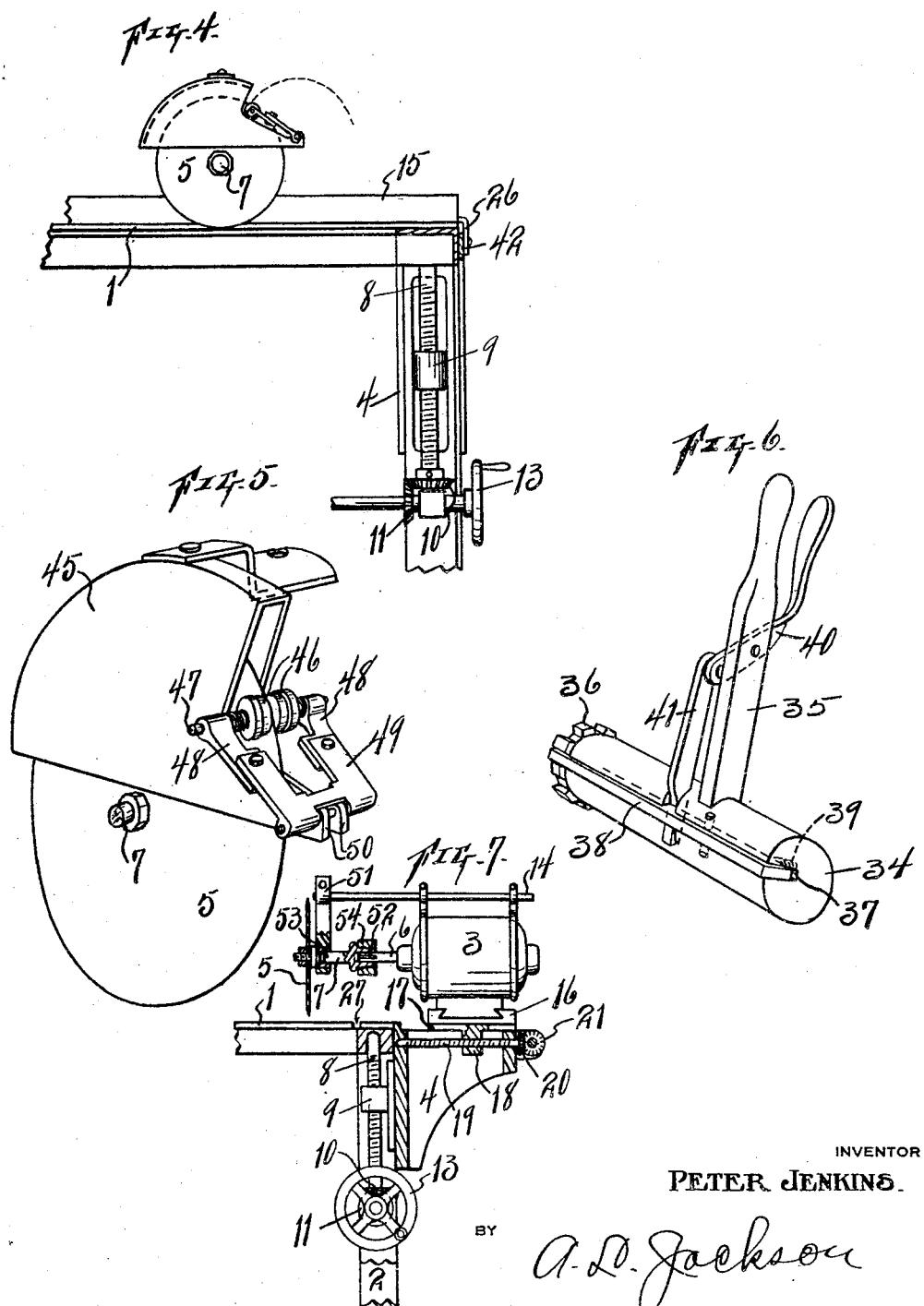
INVENTOR
PETER JENKINS
BY
A. D. Jackson
ATTORNEY Patented June 30, 1931

1,812,406

UNITED STATES PATENT OFFICE

PETER JENKINS, OF FORT WORTH, TEXAS

CLOTH CUTTING MACHINE

Application filed April 8, 1929. Serial No. 353,332.

My invention relates to cloth cutting machines and more particularly to machines for cutting cloth for making clothing; and the object is to provide a simple machine which is easily operated and which is readily adjustable for cutting pieces of cloth of different dimensions and which will hold the cloth while it is being cut and which is provided with attachments for gaging the cutting means. The advantages of such machines are that the machines will save much time and labor and the work can be done in much shorter time or much more work can be done in a given time. Other objects and advantages will be fully explained in the following description and the invention will be more particularly pointed out in the claims.

Reference is had to the accompanying drawings which form a part of this application.

Fig. 1 is a side elevation of the machine.

Fig. 2 is a plan view of the same.

Fig. 3 is an enlarged detail view, showing the manner of adjusting certain parts.

Fig. 4 is a broken view, showing the means for adjusting the motor and blade vertically, also showing the blade sharpening device for sharpening the blade.

Fig. 5 is a perspective view of the blade sharpening devices.

Fig. 6 is a detail view of means for locking the clamp against movement during operation.

Fig. 7 is a detail sectional view illustrating the connection of the motor to the machine frame and the connection of the knife and motor.

Similar characters of reference are used to indicate the same parts throughout the several views.

This machine is provided with a platform 1 for supporting the cloth to be cut and this platform is supported on legs 2. A motor 3 of suitable type is provided for driving the machine and a base or bracket 4 is provided for supporting the motor. A rotary blade or knife 5 is operatively connected to the motor shaft 6 by means of a stub shaft 7. A bearing frame 14 is mounted on the motor housing for supporting the shaft 7 and this frame is provided with a bearing for the shaft 7. The knife or blade or cutter 5 is driven by the motor. The motor base 4 is supported on a screw shaft or elevator 8. A sleeve 9 is rigid with the base 4 and this sleeve 9 is threaded interiorly and engages the screw elevator 8. The object is to elevate the knife 5 for adjusting the same to the work to be done. The screw shaft 8 is rotated by a shaft 10 which is journaled in the frame support 2 and provided with a beveled gear wheel 11 which meshes with and drives a bevel gear wheel 12 which is rigid with the screw shaft 8. The shaft 10 is driven by a crank wheel 13. With the mechanism thus described, the motor 3 and the knife operated thereby can be elevated to any position desired or required.

The motor 3 and the knife 5 are adjustable longitudinally relative to the platform 1 after they are elevated to clear the stop 15. The motor 3 is mounted on a frame 16 which is adjustable on the supports 4. The frame 16 has a dovetailed track therein and the motor 3 has a base dovetailed into the track in frame member 16. By such means the motor 3 and cutting unit can be moved laterally on the frame. The motor is mounted on a table 17 which is slidable on the arms or brackets 4. It must be understood that brackets 4 are on both sides of the machine and the gearing shown in Fig. 4, except the wheel 13, is also duplicated on both sides of the machine. Lugs 18 project from the table 17 and are rigid therewith. Screw shafts 19 are journaled in the brackets 4 and operate in the lugs 18. Gear wheels 20 are rigid with the screw shafts 19 and these gear wheels 20 mesh with and are driven by gear wheels 21 which are rigid with shaft 23. The shaft 23 is journaled in bearings 24 which are attached to brackets 4. A crank wheel 25 is rigid with shaft 23 for driving the same.

After the motor 3 and the knife 5 have been elevated, as above described, they can be adjusted longitudinally by turning the crank wheel 25. The screw shafts 19 move the motor and the knife 5 to the required positions by reason of the lugs 18 which travel on the screw shafts 19 and carry the table 17.

The cloth or other article to be cut is placed flatwise on the table or platform 1 and the edge brought against the stop 15. The stop 15 is adjustable longitudinally on the table 1 by means of brackets 26. The knife 5, in case of many layers of goods, projects into a slot 27 in the table. For cutting a few layers, a piece of paste board or card board is placed on the table 1 and the knife can cut the few layers without going into the slot 27.

The motor 3 and the knife 5 constitute the cutting unit. The cutting unit is moved laterally across the table 1 manually. A handle 28 is pivotally connected to the motor 3 and is used to move the motor and knife or cutting unit from side to side of the machine for cutting the cloth or other goods.

Means are provided for holding the cloth or other goods on the table while being cut. A clamp 29 is mounted and vertically adjustable on the machine and is adapted to hold the cloth flatwise on the table 1 to be cut. The clamp 29 is angular in cross-section and is provided with legs 30 which extend downwardly close to braces 31. Racks 32 are formed on the legs 30 and pinions 33 are provided with a shaft 34 which is journaled in the braces 31. A crank 35 is used to turn the shaft 34. Means are provided for locking the legs 30 at any elevation required. A ratchet wheel or pinion 36 is rigid with shaft 34 and the shaft 34 has a longitudinal slot 37 and a bar 38 is pivotally mounted in this slot and is held in engagement with the pinion 36 by a spring 39. A dog 40 is pivotally mounted on the crank 35 and carries a cam release 41. When the shaft 34 is to be turned, the bar 38 can be thrown out of mesh with the ratchet pinion 36 by pressing on the dog 40. During operation of the machine the shaft 34 is held against turning by the bar 38.

The stop 15 is longitudinally adjustable on the table by means of racks 42 which are connected to brackets 26 and by pinions 43 which mesh with and drive the racks 42 for moving the stop 15. This adjustment is necessary when more or less cloth is to be cut off or pieces of different dimensions are to be cut. A scale 44 is provided to determine how many inches or other measures are to be cut off.

Means are provided for sharpening the blade 5. A hanger 45 is supported on the frame 14 for carrying the sharpening devices which consist of disks 46 of steel or other material. These disks are supported on a shaft 47 which is journaled in bearings 48 which are supported on the housing or hanger 45. A yoke 49 holds the bearings 48 in place and the yoke is held in place by lugs 50 formed on the end of the hanger 45. With such arrangement the knife or cutter 5 is kept in condition for cutting the cloth or other material.

An arm 51 is rigid with the frame member 14 and a bearing 53 carried by the arm 51 and rigid therewith is fixedly secured to the shaft 7. The shaft 6 of the motor 3 is telescoped into the shaft 7, the end of the shaft 6 is slotted, having a slot 52. The end of the shaft 7 is threaded and a nut 54 having a tapering thread is screwed on the shaft 7 and clamps the shaft 7 on the shaft 6. This construction eliminates any axial or lateral movement of the motor relative to the knife 5. This is important for making the knife cut the cloth accurately.

What I claim, is:—

1. A cloth cutting machine comprising a platform, means for gaging the cloth thereon to be cut, means for clamping the cloth down on said platform, a revolving knife for cutting the cloth, means for vertically and longitudinally adjusting said knife relative to said platform, and means for driving said knife in its different positions.

2. A cloth cutting machine comprising a platform, means for gaging the cloth thereon to be cut, an adjustable clamp for holding the cloth down on said platform while being cut, a revolving knife for cutting the cloth, means for vertically and longitudinally adjusting said knife relative to said platform, means for driving said knife in its different positions, and means for moving said knife and the driving means transversely of said platform.

3. A cloth cutting machine comprising a platform, means for gaging the cloth thereon to be cut, means for clamping the cloth down on said platform, a revolving knife for cutting the cloth, a motor for driving said knife, means for vertically and longitudinally adjusting said motor and knife, and means for manually moving said motor and knife from side to side of said platform.

In testimony whereof, I set my hand, this 3rd day of April, 1929.

PETER JENKINS.